United States Patent

[11] 3,630,302

[72] Inventor John G. Holland, Sr.
648 Rocky River, Houston, Tex. 77024
[21] Appl. No. 883,701
[22] Filed Dec. 10, 1969
[45] Patented Dec. 28, 1971

[54] ARTICULATED VEHICLE HAVING CONTOUR CONTROL
12 Claims, 5 Drawing Figs.

[52] U.S. Cl. .................................................. 180/12,
180/24.02, 180/51, 280/406 R, 180/14 A
[51] Int. Cl. ...................................................... B62d 59/00
[50] Field of Search ........................................... 180/14, 12,
51, 79.2 B, 22, 44, 24.02, 9.4; 280/43.23,
405–408; 115/1

[56] References Cited
UNITED STATES PATENTS

| | | | |
|---|---|---|---|
| 2,883,774 | 4/1959 | Clifford | 180/51 X |
| 3,122,850 | 3/1964 | Rockwell | 180/51 X |
| 3,351,037 | 11/1967 | Meili | 115/1 |
| 2,928,683 | 3/1960 | Rockwell | 180/12 |
| 2,936,039 | 5/1960 | Rockwell | 280/405 X |
| 3,225,850 | 12/1965 | Simmons et al. | 280/406 X |
| 2,360,902 | 10/1944 | Simmons | 280/406 |
| 2,347,882 | 5/1944 | Choate et al. | 180/51 X |
| 3,253,671 | 5/1966 | Fielding | 180/51 |
| 3,183,991 | 5/1965 | Gamaunt | 180/44 X |
| 3,414,072 | 12/1968 | Hodges | 280/43.23 X |

*Primary Examiner*—Kenneth H. Betts
*Attorney*—David L. Moseley

ABSTRACT: In accordance with an illustrative embodiment of the present invention, an articulated vehicle comprises a front motorized unit and a rear load-carrying unit connected together by a coupling that provides a vertical steering axis, a longitudinal horizontal roll axis and a transverse horizontal pivot axis to enable the wheels of said units to conform to the contour of the terrain over which said vehicle passes, and motor means reactive in a vertical plane and with respect to said horizontal pivot axis for selectively forcing said wheels to conform to the contour of said terrain.

PATENTED DEC 28 1971

John G. Holland Sr.
INVENTOR

BY David L Mosely

ATTORNEY

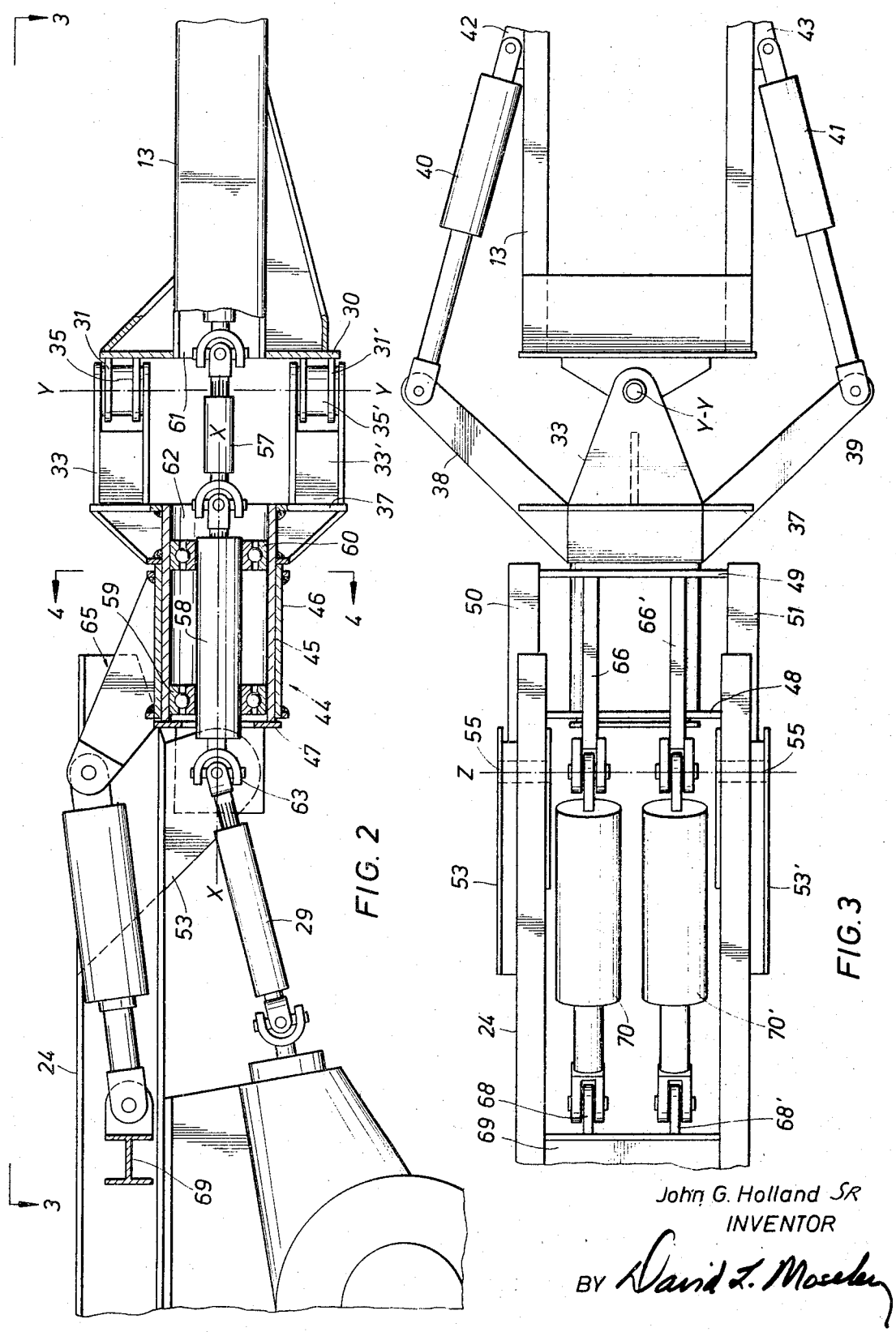

ARTICULATED VEHICLE HAVING CONTOUR CONTROL

This invention relates generally to articulated vehicles, and more specifically to a vehicle having front and rear units connected together by an articulative coupling with a selectively operable hydraulic motor that functions when needed to force the wheels of the vehicle to conform to the contour of uneven terrain.

In vehicles that are adapted primarily for operation in off-the-road conditions such as swamps, marshes, sand, snow and ice, it is desirable to provide a highly maneuverable vehicle construction that can transverse rugged and highly uneven terrain without difficulty. In load-carrying vehicles, stability is also an essential requirement. Often however, the success of a vehicle in being able to accommodate rough terrain depends upon the ability of the wheels to remain in good tractive engagement with the ground. This is particularly true where severe ground swells and troughs are encountered as well as slick or sloughy ground conditions.

Several prior art vehicles such as those shown in the Nutall U.S. Pat. No. 3,035,654 issued May 22, 1962, and the Dion U.S. Pat. No. 3,473,619 issued Oct. 21, 1969, have articulative couplings between front and rear vehicle units that enable pivotal motion in three planes to provide a relatively maneuverable vehicle construction. However, these vehicles may be lacking somewhat in stability, and have nothing to aid in obtaining optimum tractive effort in the event that the difficult terrain conditions mentioned above are encountered.

It is an object of the present invention to provide a new and improved highly maneuverable vehicle having front and rear units connected together by an articulative coupling that is provided with a motor that enables forcing the wheels of the vehicle to conform to the contour of uneven terrain conditions.

Another object of the present invention is to provide a new and improved vehicle having a front motorized unit and a rear load-carrying unit connected together by a coupling that enables articulated frame steering and noncoplanar disposition of the front and rear units so that the wheels of the units can readily conform to the contour of the terrain, together with a motor associated with the coupling in a manner such that the wheels of the vehicle can be forced to follow the contour of the terrain and obtain optimum tractive engagement therewith at all times.

Yet another object of the present invention is to provide a highly maneuverable and stable vehicle adapted for off-the-road usage under rugged conditions such as swamps, marshes, sand, snow and ice.

These and other objects are attained in accordance with the principles of the present invention by a vehicle comprising a front unit and a rear unit connected together by an articulative coupling. The coupling includes pinned forks to provide a vertical steering axis. The rear fork is connected to the inner one of two relatively rotatable tubes that provide a swivel assembly and define a longitudinal horizontal axis such that the front and rear units can roll relative to each other as the vehicle wheels encounter rough terrain. Draft members extend rearwardly from the outer tube and are pinned to draft members on the frame of the rear unit to provide a transverse horizontal pivot axis to enable all wheels of both units to engage the ground in the presence of ground swells and troughs.

In order to obtain optimum tractive effort for the wheels as the vehicle traverses uneven terrain, a motor, preferably a hydraulic power cylinder, is associated with the coupling. The motor is double acting and is reactive in a vertical plane with respect to the horizontal pivot axis, one end of the motor being attached to the frame of the rear unit and the other end attached to a bracket on the swivel assembly at a point that is displaced vertically with respect to the transverse horizontal pivot axis. Operation of the motor will apply a moment about the pivot axis that is effective to force various wheels of the units to conform to the contour of the terrain over which the vehicle passes, thereby retaining good tractive engagement therewith.

The novel features of the present invention are set forth with particularity in the appended claims. The invention has other objects and advantages which will become more clearly apparent in connection with the following detailed description of a preferred embodiment, taken in conjunction with the accompanying drawings in which:

FIG. 2 is a side sectional view of the articulative coupling between the front and rear vehicle units;

FIG. 3 is a top view to illustrate the coupling and the steering assembly;

Figure 1:
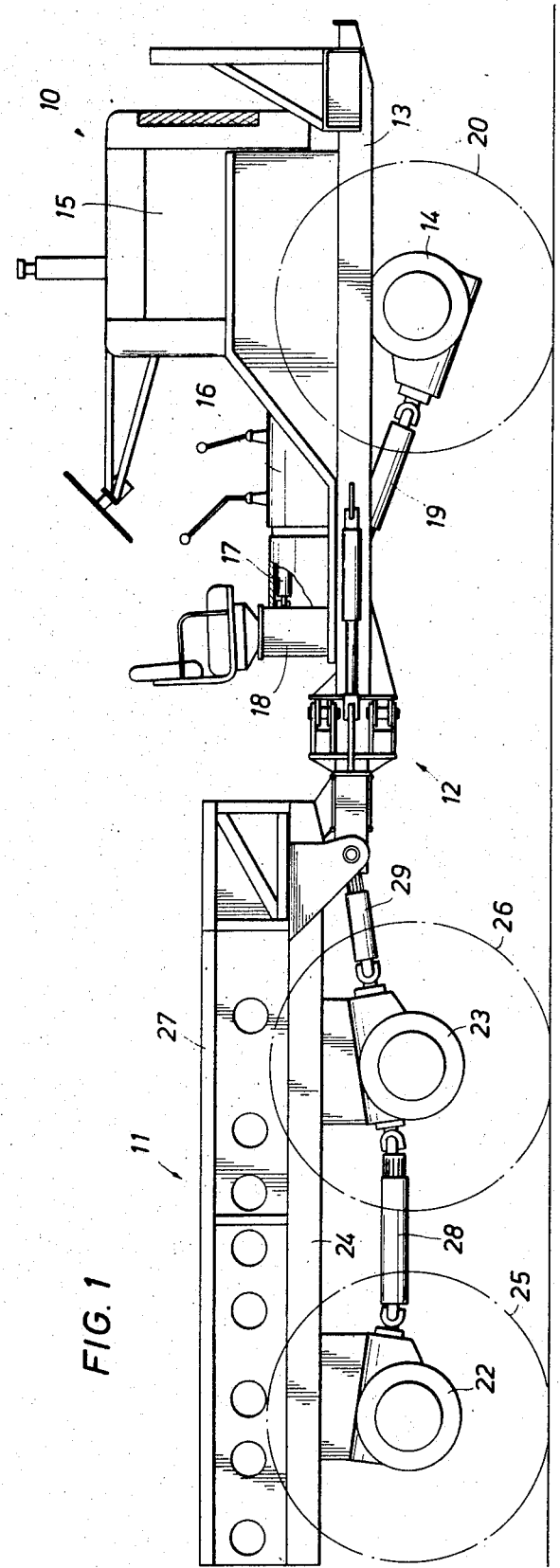
FIG. 1 is a side view showing the overall construction of a vehicle in accordance with the invention.

Referring initially to FIG. 1, a vehicle in accordance with the principles of the present invention includes a front unit 10 and a rear unit 11 connected together by an articulative coupling assembly indicated generally at 12. The front unit 10 has a frame 13 with a differential and axle housing 14 attached thereto. An engine 15 is carried by the frame 13 and is located so that its weight center is somewhat to the front of the axle therebelow. A transmission 16 has its output coupled by drive shaft 17 to the input of a typical transfer case 18. The transfer case 18 has two outputs located at the level the frame 13, the forward one being coupled by a drive shaft 19 to the differential 14, the other output pointing toward the rear unit 11. Front wheels 20 are shown in phantom lines and preferably are low pressure pneumatic tires of the type shown in the Albee U.S. Pat. No. Re 24,272, owned by the applicant of the present invention.

The rear unit 11 has longitudinally spaced differentials and axle housings 22 and 23 attached to a frame 24 by any suitable means. Each axle housing supports tires 25 and 26 of the same type as the front tires 20. The frame 24 supports a bed 27 or the like so that the rear unit is adapted for load-carrying purposes. A drive train comprising shafts 28 and 29 is coupled to the differentials 22 and 23 so that all six wheels are driven.

Turning now to FIG. 2, the details of the articulative coupling 12 are shown. A plate 30 that constitutes the rear of the front frame 13 has upper and lower centrally located tongues 31 and 31'. The tongues 31 and 31' are connected to the upper and lower arms of forks 33 and 33' by king pins 35 and 35' that define a vertical articulation axis Y—Y. The forks 33 and 33' are welded to a transverse plate assembly 37 that has outwardly and forwardly extending arms 38 and 39 rigid therewith as shown in FIG. 3, the arms being disposed in a horizontal plane. Power cylinders 40 and 41 are connected between the outer ends of the steering arms 38 and 39 and brackets 42 and 43 on the sides of front frame 13. The cylinders 40 and 41 can be actuated in a conventional manner to cause the front vehicle unit 10 to swing laterally relative to the rear unit 11 about the vertical axis Y—Y to effect steering.

Figure 4:
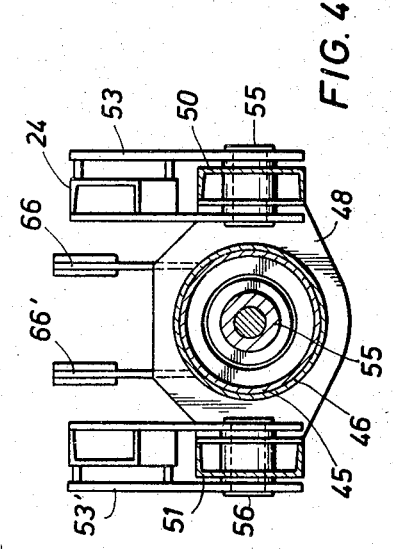
FIG. 4 is a cross section taken on line 4—4 of FIG. 2.

The plate assembly 37 constitutes the forward end of a swivel coupling 44 that provides a longitudinal horizontal articulation axis X—X such that the front and rear units 10 and 11 can roll relative to one another. An inner tube 45 is welded to the plate assembly 37 and rotatably receives an outer tube 46. An end flange 47 attached to the inner tube 45 abuts against the rear end surface of the outer tube 46 to prevent longitudinal displacement. As shown in FIGS. 3 and 4, transverse members 48 and 49 are rigidly secured to the outer tube 46 and have rearwardly extending draft members 50 and 51 welded to their outer ends. The draft members 50 and 51 are formed from channel beams or the like. The frame 24 of the rear unit 11 has downwardly extending draft members 53 and 53' that are pivoted to rearward ends of the members 50 and 51 by king pins 55, the pins defining a transverse horizontal pivot axis Z—Z. This axis enables all the wheels of the front and rear units 10 and 11 to conform to the contour of the terrain over which the vehicle passes.

As shown in FIG. 2, a short drive shaft 57 that is intersected by the vertical axis Y—Y extends between the rearwardly pointing lower output of the transfer case 18 and an intermediate drive shaft 58 that is mounted by bearings 59 and 60 in the inner tube 45 of the swivel coupling 44. Appropriate openings 61 and 62 are provided in the end plate 30 and the plate assembly 37, respectively. The rear universal 63 on the drive shaft 58 is positioned at the transverse horizontal pivot axis Z—Z to enable complete freedom of articulation about this axis. In a typical manner, the various drive shafts can have sliding splines to enable slight variation in length due to articulative movement, frame bending or the like.

As previously mentioned, the provision of the horizontal pivot axis Z—Z enables all of the wheels to remain in tractive engagement with the ground in uneven and rough terrain. However, it has been found to be highly desirable to be able to actually force the wheels to conform to the contour of the terrain. To accomplish this feature, a bracket structure 65 including side members 66 and 66' and a cross brace 67 is rigidly secured to the upper side of the outer tube 46 as well as to the transverse members 48 and 49. The uppermost portion of the bracket structure 65 is located in spaced relation and directly above the horizontal pivot axis Z—Z. A pair of brackets 68 and 68' are mounted on a suitable crossmember 69 of the rear frame 24 to the rear of the pivot axis Z—Z. A pair of hydraulic cylinders 70 and 70' have their respective ends coupled between the bracket structures 65 and 68 so that the cylinders are reactive in a vertical plane with respect to the horizontal pivot axis Z—Z. It will be apparent that extension of the cylinders 70 and 70' will apply a moment about the pivot axis Z—Z and force the front wheels 20 and the rear wheels 25 downwardly with respect to the wheels 26. Conversely, retraction of the cylinders 70 and 70' will force the center wheels 26 downwardly with respect to both the front wheels 20 and the rear wheels 25.

Figure 5:
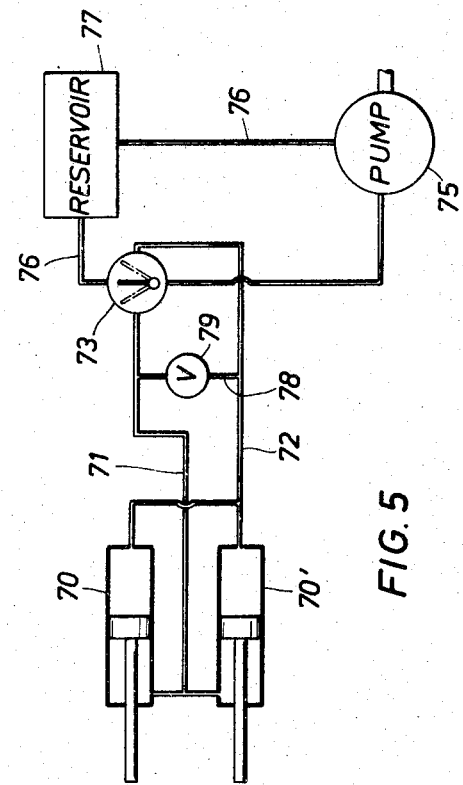
FIG. 5 is a schematic representation of the hydraulic circuit that implements the operation of the motor that can be used to force the wheels to conform to the contour of the terrain.

The cylinders 70 and 70' are controlled by a hydraulic system shown schematically in FIG. 5. The cylinders 70 and 70' are double acting with hydraulic fluid under pressure being supplied alternately to opposite sides of the power pistons via lines 71 and 72 extending from the cylinders to two ports of a conventional tandem center, four port control valve 73. Another of the ports is connected by a line 74 to the discharge side of a pump 75 that is driven by the engine 15, and the remaining port is connected by a line 76 through a reservoir 77 to the intake side of the pump. A bypass or shunt line 78 is connected across the lines 71 and 72 and is provided with a selector valve 79 that can take the form, for example, of an adjustable needle valve.

The selector valve 79 can be either open or closed and the control valve 73 has three positions. With the valve 73 in its middle or neutral position, the cylinder ports are blocked and hydraulic fluid circulates through the valve and returns to the reservoir 77. With the selector valve 79 closed, the cylinders 70 and 70' are locked and no pivotal action can occur at the axis Z—Z. With the selector valve 79 open, fluid can transfer between opposite sides of the pistons in the cylinders 70 and 70' via the bypass line 78 so that free pivotal motion is permitted about the axis Z—Z.

Placing the selector valve 79 in closed condition and the control valve 73 in another of its three positions will feed hydraulic fluid via line 71 to the rear faces of the cylinder pistons and cause the cylinders 70 and 70' to contract. This forces the midwheels 26 downwardly with respect to the front wheels 20 and the rear wheels 25. Fluid discharged from the front ends of the cylinders 70 and 70' during contractive movement passes through line 72, the control valve 73 and line 76 to the reservoir 77. Placing the control valve 73 in the remaining position will feed hydraulic fluid via line 72 to the front faces of the cylinder pistons and cause the cylinders 70 and 70' to extend. Extension of the cylinders forces the front wheels 20 and the rear wheels 25 downwardly with respect to the midwheels 26. Moreover, the cylinders 70 and 70' can be locked in a variety of positions between fully extended and fully contracted by placing the control valve 73 in neutral with the selector valve 79 closed. Of course, the selector valve 79 affords a range of flow orifice sizes depending upon the extent of opening in order to control the rate of fluid transfer between opposite sides of the cylinders 70.

In operation, the vehicle is steered by activating the steering cylinders 40 and 41. These cylinders react in a horizontal plane and function to cause the front unit 10 to swing relative to the rear unit 11 about the vertical axis Y—Y defined by the king pins 35 and 35'. As the vehicle encounters various types of uneven terrain, the front and rear units 10 and 11 can roll relative to each other about the centerline X—X of the swivel coupling 44. In the presence of ground swells and troughs, the wheels of both units are permitted to conform readily to the terrain due to the provision of the transverse pivot axis Z—Z defined by the pins 55, provided the control valve 73 is in neutral position and the selector valve 79 is open.

In the event that difficulty is encountered with uniformity of tractive effort for the various wheels in uneven or other difficult terrain conditions, the power cylinders 70 and 70' can be activated in a selective manner by the operator in order to force the wheels to conform to the contour of the terrain. The control valve 73 can be placed in one position where hydraulic fluid under pressure is supplied to the front sides of the cylinder pistons thereby causing the cylinders 70 and 70' to extend. The moment applied about the pivot axis Z—Z thrusts both the front wheels 20 and the rear wheels 25 downwardly. This particular mode of operation is highly useful when the vehicle traverses a hump or is being turned on a relatively slick or sloughy surface and the front wheels tend to skid laterally. In the opposite position of the control valve 73, hydraulic fluid under pressure acts on the rear faces of the cylinder pistons and causes the cylinders 70 and 70' to contract. In this mode, the midwheels 26 are forced downwardly with respect to the wheels 20 and 25. The tractive effort of the midwheels 26 is accordingly increased, and full contraction of the cylinders can cause the front wheels 20 to be elevated somewhat in order to advance upon a steep bank or other obstruction. As the vehicle traverses fairly even ground, the control valve 73 can be placed in the neutral position with the selector valve 79 open, enabling hydraulic fluid to transfer between opposite sides of the cylinder pistons, giving a smoothing effect to frame oscillations about the pivot axis Z—Z. With the frames 13 and 24 either level or yawed with respect to the axis Z—Z, the selector valve 79 can be closed in order to lock in such position. In this manner the cylinders 70 and 70' can be used to provide a load-leveling effect in cases where loads on the rear unit 11 are disposed toward either the front or rear of the bed 27. Other advantages in use of the control cylinders 70 and 70' will be readily apparent in view of this disclosure. For example, it is possible to raise various axles in order to facilitate tire repair.

The disposition of the pivot axis Z—Z proximate to the front end of the frame of the rear unit provides several advantages. For example, the swivel coupling is not subjected to severe bending loads that may otherwise occur when undulating terrain conditions are encountered. Moreover, the rear load-carrying unit is more stable when turns are made in such conditions. The particular frame and coupling structure shown is very sturdy and rugged and relatively easy and economical to manufacture. Of course, it will be appreciated that although the front unit has been described herein as being the motorized unit, it also can be readily adapted for load-carrying purposes in order to increase the total load-carrying capacity of the vehicle. Since certain changes or modifications may be made to the disclosed embodiment without departing from the inventive concepts involved, it is the aim of the appended claims to cover all such changes and modifications falling within the true spirit and scope of the present invention.

I claim:

1. A vehicle comprising: a front unit having at least one axle and a rear unit having at least two axles; driven wheels on said axles for moving said vehicle over the ground; an articulative coupling between said units providing a vertical steering axis, a longitudinal horizontal roll axis and a transverse horizontal pivot axis to enable said wheels to conform to the contour of the terrain over which said vehicle passes; and selectively operable double-acting motor means reactive in a vertical plane and about said horizontal pivot axis for applying a moment in either rotational direction about said horizontal pivot axis that is effective to force the wheels of said units to conform to the contour of said terrain.

2. The vehicle of claim 1 wherein said roll axis is provided by relatively rotatable members, said motor means being connected between said rear unit and a point on one of said members located in vertical spaced relation to said horizontal pivot axis.

3. The vehicle of claim 1 wherein said roll axis is provided by relatively rotatable members, said pivot axis being provided by draft members extending rearwardly of one of said rotatable members and connected to draft members on said rear unit.

4. The vehicle of claim 1 wherein said motor means includes hydraulically operable piston and cylinder means, pump means for supplying fluid under pressure to respective faces of said piston mean, and valve means for directing said fluid to respective faces of said piston means.

5. The vehicle of claim 4 further including bypass means providing direct communication between opposite faces of said piston means to enable free extension and contraction of said piston and cylinder means, said valve means including means for closing said bypass means to lock said piston and cylinder means and prevent pivotal movement with respect to said horizontal pivot axis.

6. A vehicle comprising; a front unit and a rear unit, said front unit having a frame carrying an engine for driving said vehicle, said rear unit having a frame carrying a bed or the like adapted to transport a load, each of said frames having driven ground engaging means for supporting said vehicle; articulative coupling means for connecting said units together and including relatively rotatable members providing a longitudinal horizontal roll axis and pivotally arranged draft members providing a transverse horizontal pivot axis to enable said supporting means to conform to the contour of the ground, said pivot axis being located rearwardly of said roll axis and proximate to the front end of the frame of said rear unit; and selectively operable motor means reactive in a vertical plane and about said horizontal pivot axis for applying a moment about said horizontal pivot axis that is effective to force said supporting means on the frames of said front and rear units to conform to the contour of said ground.

7. The vehicle of claim 6 wherein said motor means includes a double-acting hydraulic power cylinder having one end connected to the frame of said rear unit and the other end connected to a point on one of said relatively rotatable members in vertical spaced relation to said horizontal pivot axis, said cylinder operating to apply force to the respective frames of said units in order to conform said driven support means to the contour of the ground.

8. The vehicle of claim 7 further including pump means for supplying fluid under pressure to opposite sides of said power cylinder to selectively extend and retract said cylinder, and valve means having a neutral position providing free fluid circulation from and to said pump means and active positions for directing said fluid to respective sides of said cylinder, said valve means in neutral position blocking fluid flow from and to said cylinder.

9. The vehicle of claim 8 further including bypass means for bypassing fluid between opposite sides of said cylinder, and a bypass valve in said bypass means for selectively blocking and opening said bypass means.

10. A vehicle comprising: a front motorized unit having a single axle and a rear load-carrying unit having at least two axles; driven wheels on said axles for moving said vehicle over the ground; fork means providing a vertical axis adjacent the rear of said front vehicle; power cylinders on opposite sides of said vertical axis adapted to angulate said front unit relative to said rear unit and effect steering of said vehicle; a swivel coupling extending rearwardly of said fork means, said swivel coupling including inner and outer tubes having means to prevent longitudinal displacement, the centerline of said tubes defining a roll axis for said front and rear units; draft members rigidly fixed on opposite lateral sides of said outer tube and extending rearwardly thereof; draft members on said rear unit coupled to said first-mentioned draft members to provide a transverse horizontal pivot axis enabling said wheels to conform to the contour of the terrain over which said vehicle passes; bracket means on said outer tube having a portion located in vertical spaced relation to said pivot axis; and double-acting hydraulic cylinder means connected between said portion and a point on said rear unit so as to be reactive in a vertical plane and about said pivot axis, said cylinder means being selectively extensible and contractable for applying a moment about said horizontal pivot axis to force said wheels to conform to the contour of uneven terrain.

11. The vehicle of claim 10 further including pump means for supplying fluid under pressure to opposite sides of said cylinder means, and a control valve having a neutral position providing free fluid circulation from and to said pump means and blocking fluid flow from and to said cylinder means, said control valve having separate active positions for selectively directing said fluid to respective sides of said cylinder means.

12. The vehicle of claim 11 further including bypass means for providing direct communication between opposite sides of cylinder means, and a bypass valve for closing and opening said bypass means, said bypass means when open enabling free extension and retraction of said cylinder means as said front and rear units are pitched relative to one another about said pivot axis, said bypass means when closed enabling the direction by said control valve of fluid to respective sides of said cylinder means, said control valve in neutral position and said bypass valve closed functioning to lock said cylinder means in selected positions.

* * * * *